UNITED STATES PATENT OFFICE.

JOHN F. BASSFORD, OF NEW YORK, N. Y.

IMPROVEMENT IN PROCESSES OF PREPARING PRESERVED FRUIT.

Specification forming part of Letters Patent No. 170,700, dated December 7, 1875; application filed October 16, 1875.

*To all whom it may concern:*

Be it known that I, JOHN F. BASSFORD, of the city, county, and State of New York, have invented a new and useful Improvement in Preparing Fruits for Pastry and other uses, of which the following is a specification:

The object of this invention is to furnish prepared fruit for use in bakeries, confectioneries, pie-bakeries, hotels, and private houses, put up in such a way that it may be ready for use in making pastry and for other purposes, and which shall at the same time be more wholesome than fruits prepared in the usual way.

The invention consists in the mode of preparing fruit by mixing water and starch with the fruit when in the form of preserves, as hereinafter fully described.

In preparing the fruit, I take the desired quantity, remove the seeds, pits, or stems, put it in a kettle, and add sugar in the proportion of one pound of sugar to one pound of fruit. The quantity of sugar is varied slightly, according to the tartness of the fruit. The fruit and sugar are then boiled for fifteen minutes, more or less, to preserve the fruit, and enable it to be kept until required for use. This is the ordinary way of preserving fruit. To one quart of the preserved fruit I add one quart of water, more or less, place them in a kettle, and bring them to a boil. I then add one ounce, more or less, of starch to each quart of the diluted fruit, the starch being first wet in enough cold water to reduce it to a thin paste. The mixture is then stirred for two or three minutes, to thoroughly mix it, the stirring being continued until the foam disappears. The fruit is then ready for use when cold.

The fruit in its season is put up and kept in the form of preserves until wanted for use for my process. As thus prepared the fruit is designed to be served to bakers, or others who wish to use it, for making pastry or other uses every day, or every two or three days, and will keep perfectly good for a week or more in ordinary weather, and for two or three days in the very warmest weather.

Having thus described my invention, I claim as new and desire to secure by Letters Patent—

The process of preparing preserved fruit for the use of bakers and others by bringing an equal quantity of fruit and water to a boil, and then adding one ounce of starch to each quart of the diluted fruit, as set forth.

JOHN F. BASSFORD.

Witnesses:
 JAMES T. GRAHAM,
 T. B. MOSHER.